United States Patent [19]

Murano et al.

[11] Patent Number: 4,996,667
[45] Date of Patent: Feb. 26, 1991

[54] ELECTRON BEAM ADDRESSIBLE RECORDING DEVICE UTILIZING FERROELECTRIC RECORDING MATERIAL

[75] Inventors: Kanji Murano, Tokyo; Senri Miyaoka, Kanagawa, both of Japan

[73] Assignee: Sony Corporation, Tokyo, Japan

[21] Appl. No.: 480,362

[22] Filed: Feb. 5, 1990

Related U.S. Application Data

[63] Continuation of Ser. No. 187,295, Apr. 28, 1988, abandoned.

[30] Foreign Application Priority Data

Apr. 29, 1987 [JP] Japan .................. 62-105766

[51] Int. Cl.[5] .................. G11C 11/22; G11C 7/00
[52] U.S. Cl. .................. 365/117; 365/118; 365/145
[58] Field of Search ............. 365/117, 118, 128, 217, 365/145

[56] References Cited

U.S. PATENT DOCUMENTS

| | | | |
|---|---|---|---|
| 2,527,652 | 10/1950 | Pierce | 365/118 X |
| 3,229,261 | 1/1966 | Fatuzzo et al. | 365/118 X |
| 3,408,531 | 6/1966 | Goetze et al. | 365/118 X |
| 3,693,171 | 9/1972 | Asam | 365/117 |
| 3,792,282 | 2/1974 | Braunlich | 365/118 X |
| 3,792,449 | 2/1974 | Kazan | 365/117 X |
| 3,838,311 | 9/1974 | Dorsey et al. | 365/118 X |
| 3,950,669 | 4/1976 | Smith | 365/118 X |
| 4,004,182 | 1/1977 | Nixon | 365/118 X |
| 4,088,925 | 5/1978 | Deschamps | 365/118 X |
| 4,391,901 | 7/1983 | Land et al. | 365/117 X |

OTHER PUBLICATIONS

Magnetic Recording Technique, IBM Technical Disclosure Bulletin, vol. 2, No. 4, Dec. 1959, Hagopian.

*Primary Examiner*—Stuart N. Hecker
*Assistant Examiner*—Andrew L. Sniezek
*Attorney, Agent, or Firm*—Hill, Van Santen, Steadman & Simpson

[57] ABSTRACT

A novel electron beam addressible recording device is disclosed, in which a recording layer formed of ferroelectric material having secondary electron emissivity $\delta$ greater than 1 is provided in a vacuum chamber. One surface of the recording layer is applied with a predetermined potential and the other surface is caused to have different potentials from the predetermined potential by scanning it with an electron beam. The difference of the potentials between two surfaces of the recording layer, causes poling patterns corresponding to the data recorded to be formed. The recorded data in the form of poling direction can be detected by electron beam scanning.

3 Claims, 2 Drawing Sheets

ELECTRON BEAM ADDRESSIBLE RECORDING DEVICE UTILIZING FERROELECTRIC RECORDING MATERIAL

This is a continuation of application Ser. No. 187,295, filed Apr. 28, 1988, now abandoned.

BACKGROUND OF THE INVENTION

The present invention relates to an electron beam addressable recording device utilizing ferroelectric recording material.

There are known a variety of data recording devices including, for example, semiconductor memory devices, magnetic memory devices and optical memory devices.

However, the semiconductor memory device has a small recording capacity in the order of megabits (Mbits) although maintaining a relatively high access speed with a short access time in the order of microseconds ($\mu$sec).

In comparison therewith, the magnetic memory device which has a recording capacity in the order of 100 Mbits is relatively slow in access since its access time is as long as 10 milliseconds (msec).

For the optical memory device, the recording capacity is as great as 1 gigabits (Gbits) but its access time is longer than 100 msec.

OBJECT AND SUMMARY OF THE INVENTION

It is an object of the present invention to provide a novel recording device utilizing ferroelectric recording material.

It is another object of the present invention to provide a recording device which overcomes the drawbacks of the aforementioned conventional recording devices.

It is further object of the present invention to provide an electron beam addressable recording device utilizing ferroelectric recording material which has high access speed and large storage capacity.

It is yet further object of the present invention to provide a recording device which can provide realtime overwriting of the data.

According to one aspect of the present invention, there is provided an electron beam addressable recording device utilizing ferroelectric recording material which comprises a recording layer formed of ferroelectric material having a secondary electron emissivity $\delta$ greater than 1, an electrode formed on one surface of the recording layer, electron beam means scanning on another surface of the recording layer and a potential setting means provided on the another side of the recording layer to form potential differences between the electrode on the one surface of the recording layer based on the data to be recorded upon scanning the electron beam.

DESCRIPTION OF THE PREFERRED EMBODIMENTS

Figure 1:
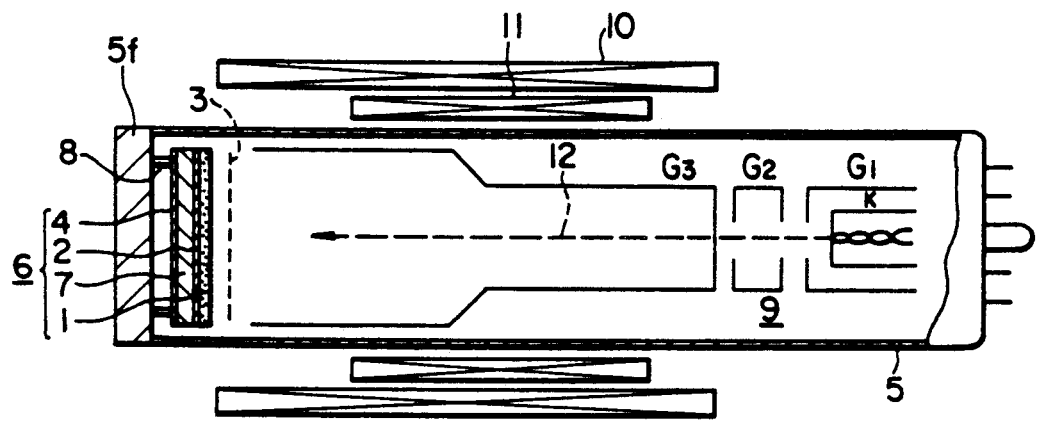
FIG. 1 illustrates the structure of an exemplary recording device embodying the present invention.
Figure 2:
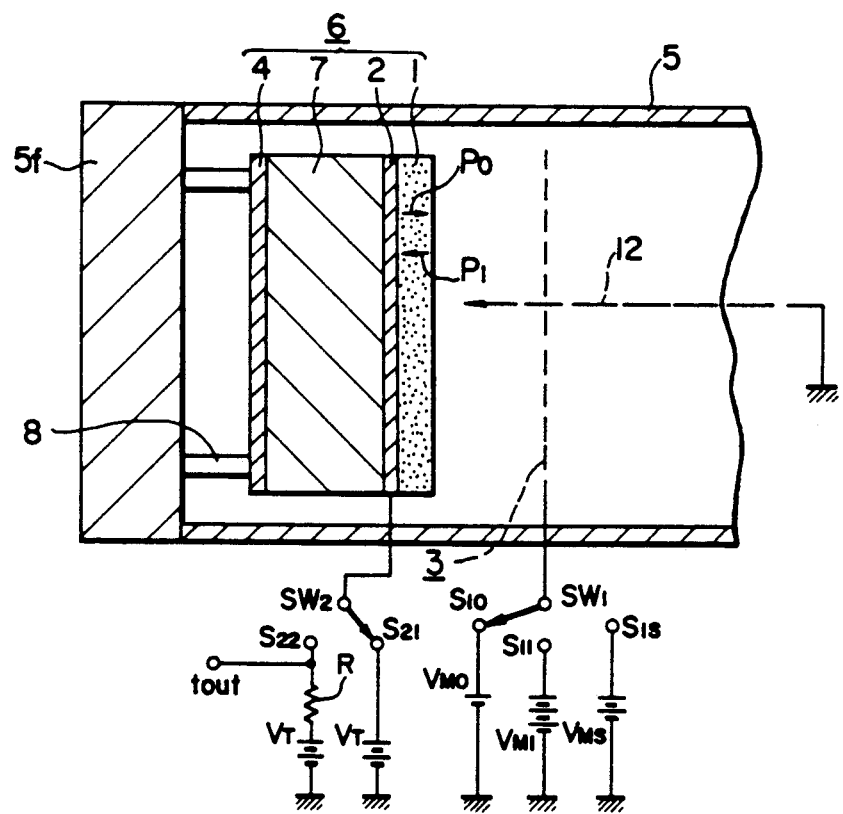
FIG. 2 is an enlarged view of principal components in the device of FIG. 1.

As illustrated in FIGS. 1 and 2 which schematically show the structure of the present invention and the principal components thereof, the memory device comprises a ferroelectric layer in which the secondary electron emissivity $\delta$ is greater than 1. An electrode 2 is disposed on one surface of the ferroelectric layer. A potential setting means 3 is disposed on the other surface side of the ferroelectric layer and serves to set such surface at a predetermined potential by scanning it with an electron beam. Means 4 are provided for heating the ferroelectric layer 1.

In the structure described above, two potentials modulated in accordance with "0" and "1" of binary data to be recorded are set by the potential setting means 3, and the data is written, as a charge pattern or a poling pattern corresponding to the data, in the ferroelectric layer 1 through cooperation with the electron beam scanning. In reading out the data, the electron beam current proportional to the charge pattern is detected by scanning the ferroelectric layer 1 with an electron beam.

FIG. 1 shows the entire structure of an exemplary recording device embodying the present invention, and FIG. 2 shows the arrangement of its principal components, wherein a glass tubular member 5 is provided, and a target 6 serves as a recording medium is disposed on the inner surface of a face plate 5f.

A potential setting means 3 is composed of a mesh electrode which is mounted opposite to the target 6.

In the tubular member 5, an electron gun 9 is mounted in the end opposite to the target 6 and the mesh electrode constituting the potential setting means 3 is positioned as shown. The inside of the tubular member 5 is evacuated.

The electron gun 9, has a cathode K and first through third grids G1–G3 which are sequentially arrayed. A focusing coil 10 and a deflecting coil 11 respectively are disposed outside of the tubular member 5 for focusing an electron beam 12, which is emitted from the electron gun 9, on the ferroelectric layer 1 of the target 6 and for scanning the layer 1 with the electron beam 12 in the horizontal and vertical directions.

The target 6 serves as a recording medium and is formed as illustrated in FIG. 2. A Ni-Cr heater which has a thickness of 1000 Å, for example, is evaporated as a heating means 4 on one surface of an insulator substrate 7 which is composed of alumina or the like and has a thickness of 30 $\mu$m.

On the other surface of the substrate 7, an electrode 2 is formed by evaporating Cr-Au or the like to a thickness of 1000 Å.

The electrode 2 is spin-coated with a layer of ferroelectric material such as $PbTiO_3$-$PbZrO_3$ by for example, a so-called sol-gel process and, by subsequent baking at a temperature of 700° C. or so, a ferrodielectric layer 1 is formed with a thickness of 1 $\mu$m.

The target 6 has an area of, for example, 5×5 cm².

The target 6 is held by a support means 8 such struts on the face plate 5f in a manner such that its one side with the ferroelectric layer 1 is in the path of the beam from electron gun 9.

The heating means 4 is used for applying heat to the ferroelectric layer 1 of the target 6. The energy required for heating the target 6 having a volumn of 5×5×0.0033 cm³ to cause a temperature rise of 100° C. is about 25 Joule since the specific heat is 3 Joule/cm³

.deg. Therefore, the required heating time is 1 sec if the means 4 has a power of 25 W, and the heating time becomes 100 msec when the power is 250 W.

Now a description will be given below for the recording and reading operation performed in the device of the present invention.

The voltage $V_M$ which is applied to the potential setting means 3 can be changed to three different values of $V_{M0}$, $V_{M1}$ and $V_{MS}$. As shown in FIG. 2 a mechanical switch $SW_1$ allows the voltage applied to the potential setting means 3 to be selectively switched. In this example, the potential $V_{M0}$, $V_{M1}$ or $V_{MS}$ is applied when a movable contact connected to the means 3 is respectively switched to fixed contacts $S_{10}$, $S_{11}$ or $S_{1S}$.

A predetermined potential $V_T$ is applied to the electrode 2. When a movable contact of a switch $SW_2$ is connected to its fixed contact $S_{21}$, the voltage $V_T$ (e.g. 500 V) is applied; and when the movable contact is connected to another fixed contact $S_{22}$, an output voltage which has dropped through a resistor R is obtained at terminal $t_{out}$.

In a data writing mode where the switch $SW_2$ selects the contact $S_{21}$ for application of a predetermined potential $V_T$ (e.g. 500 V) to the electrode 2, the voltage $V_M$ to the potential setting means 3 is changed so that two potentials $V_{M0}$ and $V_{M1}$ corresponding respectively to "0" and "1" of the data to be recorded are applied through selective connections to the contacts $S_{10}$ and $S_{11}$ of the switch $SW_1$. The two values $V_{M0}$ and $V_{M1}$ of the potential $V_M$ to the means 3 are determined as, for example, $V_{M0}=495$ V and $V_{M1}=505$ V.

Suppose now that the contact $S_{10}$ is selected by the switch $SW_1$ and the voltage $V_M$ is applied to the means 3 is $V_{M0}(=495$ V), and the electron beam 12 from the electron gun 9 will bombard the ferrodielectric layer 1. Then, if the secondary electron emissivity δ of the ferroelectric layer 1 is greater than 1 in the state where the electron beam to the ferroelectric layer 1 is under the acceleration voltage, secondary electrons will be emitted from the ferroelectric layer 1 by the bombardment of the accelerated electrons, and the secondary electrons thus emitted are caught by the potential setting means 3 which is composed of a mesh electrode disposed opposite to the ferroelectric layer 1, so that the surface potential of the ferroelectric layer 1 is raised positively according to the emission of secondary electrons. When the potential $V_{M0}(=495$ V) of the means 3 rises, the secondary electrons will no longer be caught by the means 3 so that emission of the secondary electrons is suppressed, whereby the surface potential $V_{M0}$ of the ferroelectric layer 1 is balanced at 495 V. As a result, in the ferroelectric layer 1, the potential $V_A$ toward the electrode 2 is changed to $V_T(=500$ V) while the surface potential $V_B$ is changed to $V_{M0}(=495$ V). Consequently, the following potential difference exists in the direction of its thickness:

$$V_A - V_B = (500 - 495)V = 5V \quad (1)$$

In case the ferroelectric layer 1 has a thickness of 1 μm, a high electric field is applied with a field intensity of 5 V/μm=5 kV/mm along the direction of the thickness. When such a high electric field is applied to the ferroelectric substance, as is well known, there occurs a poling phenomenon with an array of spontaneous polarization, and the poling $P_0$ is stored to eventually record data "0", for example.

Due to a similar phenomenon, when the contact $S_{11}$ is selected by the switch $SW_1$ and the voltage $V_M$ applied to the means 3 is $V_{M1}(=505$ V), the surface potential $V_B$ of the ferroelectric layer 1 becomes equal to $V_{M1}(=505$ V), whereby the following potential difference is caused in the direction of its thickness:

$$V_A - V_B = (500 - 505 V) = -5V \quad (2)$$

As a result, the poling $P_1$ directionally reverses to the recording state of the aforesaid data "0" is generated to eventually record data "1", for example.

Therefore, if the voltage applied to the means 3 is modulated with "0" or "1" or the data to be recorded in compliance to the scanning position of the electron beam on the ferroelectric layer 1, that is, if the potential $V_{M0}$ or $V_{M1}$ is selectively applied to the means 3, then either of the mutually opposite poling patterns $P_0$ and $P_1$ can be produced in the ferroelectric layer 1 so as to eventually write binary "0" or "1" therein.

The data "0" and "1" thus written are read out in the following manner.

In a data reading mode, the switch $SW_1$ is moved to select contact $S_{1S}$ so as to apply a predetermined potential $V_{MS}$ to the means 3, while the switch $SW_2$ is moved to select the contact $S_{22}$ for applying to the electrode 2 the same potential $V_A$ (=500 V) as the value in the writing mode. The potential $V_{MS}$ is intermediate between $V_{M0}$ and it $V_{M1}$ and is assumed here to be 500 V which is equal to the potential $V_T$ of the electrode 2. In this case, if the surface charge obtained in the writing mode exists on the surface of the ferroelectric layer 1, the electron beam 12 is repelled from the portion of the ferroelectric layer 1 where the surface potential $V_B$ in the writing mode is equal to $V_{M0}(=495$ V) which is lower than the potential $V_{MS}(=500$ V) of the means 3, so that the beam current does not flow therein and flows in the other layer portion where the potential $V_B$ is equal to $V_{M1}(=505$ V). Consequently, in accordance with the potential pattern of "0" or "1" recorded on the surface of the ferroelectric layer 1, an output corresponding to "0" or "1" is obtained from the terminal $t_{out}$.

Figure 3:
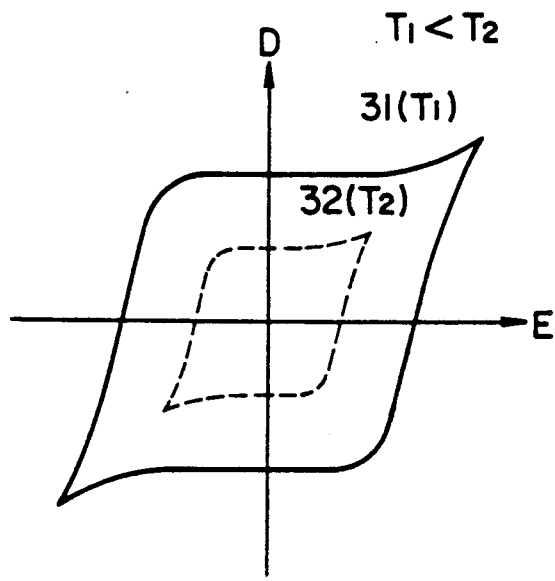
FIG. 3 graphically shows the characteristic curve of a dielectric flux density to an electric field.
Figure 4:
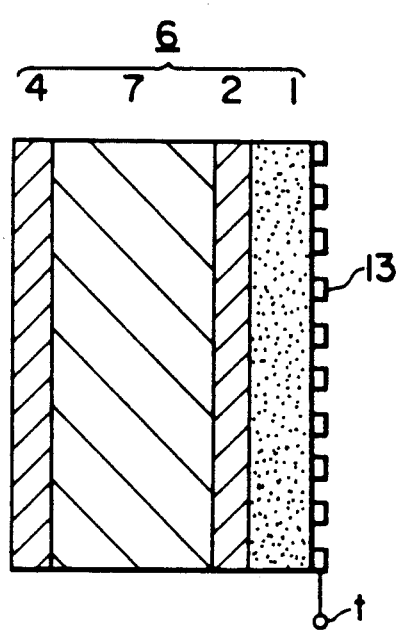
FIG. 4 illustrates the structure of a target in a modified embodiment of the invention.

However, the charge pattern formed by the potential pattern on the surface of the ferroelectric layer 1 disappears if the data is read out once or several times with the electron beam scanning executed once or several times. For prevention of this problem, a pyro electric effect is utilized for repeatedly reading out the recorded data. In the ferroelectric substance, as shown in FIG. 3 where a solid line curve 31 and a broken line curve 32, respectively, represent the characteristic of the dielectric flux density D to the electric field E at different temperatures T1 and T2 (T1<T2), the D—E characteristic varies depends on the temperature in a manner such that the dielectric flux density D becomes lower with rising temperature. Supposing that the heating means 4 is energized to heat the ferroelectric layer 1 up to a desired temperature of, e.g. 50° C. higher than room temperature, the charge is induced by the pyro electric effect. A latent image of the charge is formed in accordance with the direction of the poling $P_0$ or $P_1$ corresponding to the recorded data, so that the data can be read out again with the aforementioned electron beam scanning. Thus, it becomes possible to read out the recorded data repeatedly by utilizing the pyro electric effect which is achieved by energizing the heating means 4 in the reading mode to hold the data.

In an overwriting mode for rewriting the data in the device of the present invention, the aforementioned writing operation is similarly performed on the basis of new data so that the poling array based on the preceding data is replaced with the poling array based on the new data.

In the structure described above, the following recording density is achieved.

In relation to the pyro electric constant P of the ferroelectric layer 1, the recording area (electron-beam spot area) S and the temperature rise $\Delta T$, the pyro electric charge Q is expressed as:

$$Q = P \cdot S \cdot \Delta T \tag{3}$$

Assuming now that the ferroelectric layer 1 is composed of a ceramic material such as $PbTiO_3 - PbZrO_3$, the pyro constant is given by:

$$P = 2.5 \times 10^{-8} C/cm^2 \cdot deg$$

Under the condition of $5 \times 10^{-15} C$ (coulomb) with the signal-to-noise ratio being 26 dB, the detectable level is calculated from Eq. (3) as:

$$S \cdot \Delta T = Q/P = 2 \times 10^{-7} cm^2 \cdot deg$$

Since the value of $S \cdot \Delta T$ remains constant, the temperature rise $\Delta T$ increases with reduction of the spot area. The temperature rise $\Delta T$ in practical use is determined by limitations in the Curie point of the ferroelectric layer 1 and the restriction in the power of the heating means 4. The individual values are listed in Table 1 below with reference to the spot diameter $\phi$.

TABLE 1

| Spot diameter $\phi$ ($\mu m$) | Recording area S ($\mu m^2$) | $\Delta T$ (deg) | Recording density MBytes/$cm^2$ | Capacity (MB) with $5 \times 5\ cm^2$ |
|---|---|---|---|---|
| 0.4 | 0.126 | 160° | 78 | 1953 |
| 0.5 | 0.196 | 100° | 50 | 1250 |
| 0.6 | 0.282 | 70° | 34.7 | 868 |
| 0.8 | 0.503 | 40° | 19.5 | 488 |
| 1.0 | 0.785 | 25° | 12.5 | 312 |
| 1.2 | 1.13 | 18° | 8.7 | 217 |

In Table 1, 1 Byte is composed of 8 bits.

The access time is determined by the electron beam positioning time with the exception of the time required for initial heating. The required heating time, which is dependent on the value of $\Delta T$, becomes about 100 msec under the condition that $\Delta T$ is 100° C. and the heating means has a power of 250 W.

The transfer rate is determined only by the electron-beam scanning time.

Since the charge pattern is rendered extinct when the data is read out once or several times as mentioned, in the above embodiment a procedure for cooling the ferroelectric layer 1 is used and then heating it again. However, for enabling repeated read of the data by heating the ferroelectric layer 1 merely once, a modification may be constructed, as illustrated in striped parallel electrodes 13 are disposed on the ferroelectric layer 1, and an output terminal t is led out. In a data writing mode, the operation is performed in the same manner as mentioned previously; whereas in a data reading mode, the electron beam incident upon the electrodes 13 is modulated by the potential corresponding to the recorded data on the surface of the ferroelectric layer 1, so that a signal current representing the recorded data can be obtained. In this case, the charge on the surface of the ferroelectric layer 1 is preserved without any changes and can therefore be repeatedly read out.

According to the structure of the present invention, as described hereinabove, the data recording device is capable of obtaining enhanced recording density, shorter access times and higher data transfer rates.

We claim as our invention:

1. An electron beam addressable writing and reading device for storing binary information utilizing ferroelectric material comprising: a recording layer with one surface and another surface and formed of ferroelectric material which has secondary electron emissivity $\delta$ greater than 1, an electrode disposed on said one surface of said recording layer to which is selectively applied first or second electrical potentials which are used respectively for writing and reading said binary information, an electron gun generating an electron beam which is scanned on said another surface of said recording layer which is opposite to said one surface, means for selectively controlling the electrical potential of said another surface of said recording layer to third, fourth or fifth electrical potentials wherein said third and fourth electrical potentials are respectively higher and lower than said fifth electrical potential so that a binary one is written in said ferroelectric material when said third electrical potential is applied and a binary zero is written in said ferroelectric material when said fourth electrical potential is applied and it is scanned with said electron beam, and said third and fourth electrical potentials are selectively applied to selectively write said binary information when said first electrical potential is applied and said binary information is read when said fifth electrical potential and said second electrial potential are selectively applied.

2. An electron beam addressable writing and reading device for recording binary information utilizing ferroelectric material comprising; a vacuum chamber containing therein a recording layer with one and another surface and formed of ferroelectric material having electron emissivity $\delta$ greater than 1, a field mesh electrode mounted adjacent said another surface of said recording layer, an electron gun mounted so as to apply an electron beam through said field mesh electrode on to said recording layer, said one surface of said recording layer provided with an electrode for selectively applying a first or a second electrical potential which are, respectively used for writing and reading binary information, said another surface of said recording layer which is opposite to said one surface receiving said electron beam which is generated by said electron gun and said beam passing through said field mesh electrode, said field mesh electrode selectively receiving a third electrical potential which is higher than said first electrical potential so as to write a binary one on said recording layer and a fourth electrical potential which is lower than said first electrical potential so as to write a binary zero on said recording layer, and a fifth electrical potential which is equal to said first electrical potential for reading binary information and first switching means selectively switching said third and fourth electrical potentials to said field mesh electrode for writing binary information and to switch said fifth electrical potential to said field mesh electrode for reading said binary information, and second switching means switching said first and second electrical potentials to said recording for respectively, writing and reading binary information.

3. An electron beam addressable recording device according to claims 1 or 2 including a heater mounted adjacent said recording layer to heat it to allow binary information to be read out repeatedly.

* * * * *